United States Patent [19]

Chundury

[11] Patent Number: 5,278,231
[45] Date of Patent: Jan. 11, 1994

[54] IMPACT-RESISTANT COMPATIBILIZED POLYMER BLENDS OF OLEFIN POLYMERS AND POLYAMIDES

[75] Inventor: Deenadayalu Chundury, North Royalton, Ohio

[73] Assignee: Ferro Corporation, Cleveland, Ohio

[21] Appl. No.: 945,511

[22] Filed: Sep. 16, 1992

Related U.S. Application Data

[63] Continuation of Ser. No. 528,567, May 24, 1990, abandoned.

[51] Int. Cl.$^5$ ............................................. C08L 77/00
[52] U.S. Cl. ............................................. 525/66; 525/92; 525/179
[58] Field of Search ............................................. 525/92, 66

[56] References Cited

U.S. PATENT DOCUMENTS

| | | | |
|---|---|---|---|
| 2,971,939 | 2/1961 | Baer | 260/45.5 |
| 3,113,986 | 12/1963 | Breslow et al. | 260/683.9 |
| 3,251,905 | 5/1966 | Zelinski | 260/879 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,390,207 | 6/1968 | Moss et al. | 260/879 |
| 3,598,887 | 8/1971 | Darcy et al. | 260/879 |
| 3,639,521 | 2/1972 | Hsieh | 260/880 |
| 4,110,303 | 8/1978 | Gergen et al. | 260/42.18 |
| 4,174,358 | 11/1979 | Epstein | 525/183 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,427,828 | 1/1984 | Hergenrather et al. | 525/66 |
| 4,429,076 | 1/1984 | Saito et al. | 525/57 |
| 4,578,429 | 3/1986 | Gergen et al. | 525/291 |
| 4,647,509 | 3/1987 | Wallace et al. | 428/474.9 |
| 4,657,970 | 4/1987 | Shiraki et al. | 525/57 |
| 4,795,782 | 1/1989 | Lutz et al. | 525/66 |
| 4,849,471 | 7/1989 | Saito et al. | 525/66 |

OTHER PUBLICATIONS

Ide and Hasegawa, J. Appl. Polym. Sci., 18, 963 (1974).
Chen et al. Polym. Engng. Sci., 28, 69 (1988).
Park et al., Eur. Polym J., vol. 26, No. 2, pp. 131-136, 1990.

*Primary Examiner*—Ana L. Carrillo
*Attorney, Agent, or Firm*—Rankin, Hudak & Hill

[57] ABSTRACT

Blended polymer compositions are described which comprise
(I) from about 1% to about 97% by weight of at least one alpha-olefin polymer;
(II) from about 1% to about 97% by weight of at least one polyamide;
(III) from about 1% to about 97% by weight of at least one polymer of a vinyl aromatic hydrocarbon; and
(IV) an effective amount of a mixture of two or more compatibilizing agents selected from the group consisting of
(IVa) at least one selectively hydrogenated block copolymer of a vinyl aromatic hydrocarbon and a conjugated diene;
(IVb) at least one selectively hydrogenated block copolymer of a vinyl aromatic hydrocarbon and a conjugated diene to which has been grafted, an alpha,beta-olefinically unsaturated monocarboxylic or dicarboxylic acid reagent; and
(IVc) at least one terpolymer of an alpha-olefin, at least one acrylic ester, and an alpha,beta-olefinically unsaturated dicarboxylic acid reagent, or a glycidyl acrylate.

The polymer blends of the present invention have improved impact-resistance.

21 Claims, No Drawings

IMPACT-RESISTANT COMPATIBILIZED POLYMER BLENDS OF OLEFIN POLYMERS AND POLYAMIDES

This a continuation of copending application Ser. No. 07/582,567 filed May 24, 1990, now abandoned.

FIELD OF THE INVENTION

This invention relates generally to polymer blends which are polymeric compositions comprising a mixture of an olefin polymer, a polyamide, polymers or copolymers of vinyl aromatic compounds, and two or more compatibilizers.

BACKGROUND OF THE INVENTION

Thermoplastic polyamides such as nylon 6,6, have been widely used in the formation of mechanical parts and electrical parts for which excellent mechanical characteristics, high heat resistance and good durability are required. Although polyamides have good heat resistance and high mechanical strength, they are deficient in that the impact resistance, notch sensitivity and moisture resistance are poor. The impact resistance of the polyamides can be improved by blending them with another polymer. However, in general, physical blending of polymers does not provide a complete solution to the poor impact properties of polyamides because the polymers which improve the impact resistance of the thermoplastic polyamides are generally immiscible with the polyamide which results in poor adhesion between the polymers of the blend. As a result, interfaces between blend component domains are areas of weaknesses resulting in mechanical failure.

It is difficult, for example, to obtain a good dispersion of a combination of a polar polymer such as a thermoplastic polyamide with a non-polar polymer such as a polyolefin. It is known that the addition of a graft or block copolymer of similar chemical structure to the blend components can improve the quality of the dispersion. These copolymer additives, generally referred to as compatibilizers, are often added as a third component to the blend. Maleic anhydride grafted polypropylene has been suggested as a compatibilizer for polypropylene/nylon blends by Ide and Hasegawa, *J. Appl. Polym. Sci.*, 18, 963 (1974). The compatibilization of polyethylene/polyamide blends with maleic anhydride grafted polypropylene has been reported by Chen et al in *Prym. Engng. Sci.*, 28, 69 (1988). These and similar blends have been studied, and the results reported by Park et al in *Eur. Polym. J.*, Vol. 26, No. 2, pp. 131-136, 1990.

It has been previously proposed to increase the impact strength of polyamides by the addition of modified block copolymers. For example, Hergenrother in U.S. Pat. No. 4,427,828, discloses blends of thermoplastic polyamide with a modified block copolymer.

Another deficiency of the polyamides is their tendency to absorb water which results in the degradation of its desirable properties. The blending of polyolefins with polyamides has been suggested as a method for decreasing the water absorption for such a blend since a portion of the polyamide which absorbs water would be replaced by a polyolefin which is generally hydrophobic. However, attempts to improve the impact strength of polyamides with polyolefins have generally been unsuccessful because the polyamides were incompatible with the polyolefins.

U.S. Pat. No. 4,795,782 (Lutz et al) describes a polymer blend reported to exhibit improved impact resistance, and this polymer composition comprises a polyamide, a functionalized polyolefin and a functionalized elastomer. The functionalized polyolefins are obtained by reacting a polyolefin with an unsaturated mono- or polycarboxylic acid or derivative thereof. Suitable unsaturated mono- or polycarboxylic acids include maleic acid, maleic anhydride, fumaric acid, etc. The functionalized elastomers described in U.S. Pat. No. 4,795,782 are generally functionalized selectively hydrogenated block copolymers of conjugated dienes and vinyl aromatic compounds. The block copolymers are functionalized by grafting the copolymers with a mono- or polycarboxylic acid compound such as maleic acid, maleic anhydride, fumaric acid, etc. Other monomers which are utilized for introducing the functionality include vinyl monomers such as acrylamide, acrylonitrile, monovinyl aromatic compounds (i.e., styrene), vinyl esters, vinyl ethers, etc.

U.S. Pat. No. 4,657,970 (Shiraki et al) describes polymer compositions comprising at least one thermoplastic polymer including polyamides, thermoplastic polyesters, thermoplastic polyurethanes, vinyl alcohol polymers, etc., and at least one modified block copolymer of a monovinyl-substituted aromatic hydrocarbon polymer block A and at least one olefin compound polymer block B, to which has been grafted at least one molecular unit containing at least one member selected from a carboxylic acid group and groups derived therefrom. The modified copolymers and compositions described by Shiraki are reported to have excellent impact resistance, adhesion, paint adhesion, weatherability, resistance to aging, transparency, etc.

It is known that incompatibility problems may be overcome through the use of a compatibilizing agent. A compatibilizing agent is a material which, on a molecular scale, has particular regions which are compatible with each of the incompatible constituent polymers. Such compatibilizing agents typically surround one polymeric phase providing a chemical and/or physical bridge to the other polymeric phase. Insomuch as portions of the compatibilizing agent are compatible with each of the constituent polymers, the bonding between the two incompatible polymeric phases is effectively enhanced through this intermediate compatibilizing phase. Such a system of incompatible polymers coupled by a compatibilizing agent results in a material which advantageously combines the more desirable properties of the constituent polymers. Lindsey et al., *J. Appl. Polymer Sci.*, Vol. 26, 1-8 (1981) describe a method of reclaiming mixed immiscible polymers by employing a compatibilizing agent. The system studied was a high density polyethylene (HDPE) and polystyrene (PS) and a styrene-ethylene-butene-1-styrene (SEBS) copolymer (a linear triblock copolymer) as the compatibilizing agent. These ternary blends exhibited a considerable improvement in the balance of mechanical properties over a binary blend of high density polyethylene and polystyrene.

U.S. Pat. No. 4,647,509 discloses a multilayer thermoformable packaging material comprising a first layer of (a) a vinylidene chloride polymer, (b) an incompatible polymer, e.g., polyesters and nylons, and (c) a compatibilizing agent, and a second layer of (a) a blend of an olefin polymer, a styrenic polymer, and a compatibilizing polymer, and (b) scrap material produced from the first and second layers. The compatibilizing polymers for the second layer are preferably block copolymers of olefins and styrene such as copolymers of styrene-butadiene, styrene-butadiene-styrene, styrene-isoprene, etc.

SUMMARY OF THE INVENTION

Blended polymer compositions are described which comprise
(I) from about 1% to about 97% by weight of at least one alpha-olefin polymer;
(II) from about 1% to about 97% by weight of at least one polyamide;
(III) from about 1% to about 97% by weight of at least one polymer of a vinyl aromatic hydrocarbon; and
(IV) an effective amount of a mixture of two or more compatibilizing agents selected from the group consisting of
  (IVa) at least one selectively hydrogenated block copolymer of a vinyl aromatic hydrocarbon and a conjugated diene;
  (IVb) at least one selectively hydrogenated block copolymer of a vinyl aromatic hydrocarbon and a conjugated diene to which has been grafted, an alpha,beta-olefinically unsaturated monocarboxylic or dicarboxylic acid reagent; and
  (IVc) at least one terpolymer of an alpha-olefin, at least one acrylic ester, and an alpha,beta-olefinically unsaturated dicarboxylic acid reagent, or a glycidyl acrylate;

DESCRIPTION OF THE PREFERRED EMBODIMENTS

(I) The Olefin Polymers

One of the essential components of the blended polymer compositions of the present invention is at least one olefin polymer, and in one embodiment, the olefin polymer is present in the blended polymer composition in amounts of from 1% to about 97% by weight, and more often at least about 60% by weight and up to about 90% by weight. In another embodiment, the polymer compositions of the present invention will contain from about 70% to about 90% by weight of the olefin polymer.

The olefin polymers employed in the blends of the present invention generally are semi-crystalline or crystallizable olefin polymers including homopolymers, copolymers, terpolymers, or mixtures thereof, etc., containing one or more monomeric units. Polymers of alpha-olefins or 1-olefins are preferred in the present invention, and these alpha-olefins may contain from 2 to about 20 carbon atoms. Alpha-olefins containing 2 to about 6 carbon atoms are preferred. Thus, the olefin polymers may be derived from olefins such as ethylene, propylene, 1-butene, 1-pentene, 4-methyl-1-pentene, 1-octene, 1-decene, 4-ethyl-1-hexene, etc., or mixtures of two or more of these olefins. Examples of particularly useful olefin polymers include low-density polyethylene, high-density polyethylene, linear low density polyethylene, ultra low density polyethylene, polypropylene (including isotactic polypropylene), (high and low density) poly(1-butene), poly(4-methyl-1-pentene) ultra low molecular weight polyethylene, ethylene-based ionomers, poly(4-methyl-1-pentene), ethylene-propylene copolymers, ethylene-propylene-diene copolymers (EPDM), copolymers of ethylene and/or propylene with other copolymerizable monomers such as ethylene-1-butylene copolymer, ethylene-methyl acrylate copolymer, ethylene-ethyl acrylate copolymer, propylene-4-methyl-1-pentene copolymer, ethylene-vinyl acetate copolymer, maleated ethylene vinyl acetate copolymer, maleated ethylene methyl acrylate copolymer, ethylene vinyl alcohol copolymer, ethylene-methyl acrylate-acrylic acid terpolymers, ethylene methyl acrylate-maleic anhydride terpolymer, etc. Halogenated olefins, polymers and copolymers may also be used in this invention.

The number average molecular weight of the polyolefins is preferably above about 10,000 and more preferably above about 50,000. In addition, it is preferred in one embodiment that the apparent crystalline melting point be above about 75° C. and preferably between about 75° C. and about 250° C. Most commercial polyethylenes have a number average molecular weight of from about 50,000 to about 500,000. The olefin polymers useful in preparing the polymer blends of the present invention are well-known to those skilled in the art and many are available commercially. The olefin polymers may be homopolymers, impact copolymers, block copolymers, random copolymers, thermoplastic olefinic elastomers (TPO), etc., or mixtures thereof. Polyethylene and polypropylene are preferred olefin polymers. High density polyethylenes such as Phillips 6001, Cain's 7040 and Soltex G5012, and polypropylene homopolymers such as Himont's Profax 6523, Shell's 7C06 or Exxon's PD7132 and 7163, or Aristich's 4040F (polypropylene-ethylene copolymers) are particularly preferred.

(II) Polyamide Resins

The blended polymer compositions of the present invention contain from about 1 to about 97% by weight of at least one polyamide resin, and preferably, the polyamide resin has a number average degree of polymerization of at least 100 or a number average molecular weight of at least about 5000. In more preferred embodiments, the blended polymer compositions of the present invention will contain from about 5% to about 25% by weight of the polyamide and more often from about 10% to about 20% by weight of the polyamide. The polyamides provide the blended polymer compositions of the present invention with desirable properties such as strength and stiffness.

The polyamide resins useful in the blended polymer compositions of the present invention include a variety of polyamide resins including semi-crystalline and amorphous or transparent polyamides. These polyamide resins have been commonly referred to as nylons.

The polyamide resins can be produced by condensation of equimolar amounts of a saturated dicarboxylic acid containing from 4 to 12 carbon atoms with a diamine in which the diamine contains from about 4 to about 16 carbon atoms. Alternatively, the dicarboxylic acids utilized to form the nylons may be aromatic dicarboxylic acids such as isophthalic acid or terphthalic acid. Examples of aliphatic saturated dicarboxylic acids include sebacic, octadecanoic acid, sebaric acid, azelaic acid, undecanedioic acid, glutaric acid, pimelic acid, and especially adipic acid.

Examples of diamines which can be reacted with dicarboxylic acids to form nylons include diamines such as tetramethylenediamine, pentamethylenediamine, octamethylenediamine, decamethylenediamine, hexadecamethylenediamine, and in particular, hexamethylenediamine. Examples of aromatic amines which can be utilized include para-phenylenediamine and 4,4'-diaminodiphenylsulfone.

Polyamide resins also can be produced by ring-opening polymerization of a cyclic lactam. Excess diamine can be employed to provide an excess of amine ends groups over carboxyl end groups in the polyamide. Examples of specific polyamides which are useful in the latter compositions of the present invention include polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), the polyamide producted by ring opening of lactams such as polycaprolactam, polybutyrolactam, polypivalolactam, polylauriclactam, poly-11-amino undecanoic acid, bis(paraminocyclohexyl)methane dodecanoamide, etc.

It is also possible to utilize polyamides prepared by copolymerization of two or more of the above polymers or terpolymerization of the above polymers or their components. For example, a suitable polyamide is an adipic isophthalic acid, hexamethylene diamine copolymer. Other copolymers include nylon-6/nylon-66 and nylon-6/nylon-12.

As noted earlier, transparent or amorphous polyamides are also useful in the polymer blends of the present invention. The amorphous or transparent polyamides are also prepared by condensation of a dicarboxylic acid with a diamine, but the particular dicarboxylic acid and diamine combinations are selected to provide polyamides which are amorphous or transparent. Transparent polyamides are commercially available from a variety of sources under various tradenames. For example, Ultramid K1297/2 (formerly K4601) is a transparent polyamide available from BASF. Transparent polyamides available under the trade designations PA7030 and 5050 are available from Dow Chemical Company.

Although polytetramethylene adipamide was known to W. H. Carouthers many years ago, the polyamide was not commercialized because of the lack of an inexpensive source of the required 1,4-diaminobutane. As a result of a recent new route to the synthesis of 1,4-diaminobutane, and because of the outstanding physical characteristics of these polyamides including tensile strength, impact strength and abrasion resistance, nylon 4,6 is one preferred example of a polyamide suitable for use in the blended polymer compositions of the present invention.

The polyamides which generally have a number average molecular weight of at least about 200 up to about 30,000 although in one embodiment, it is preferred to utilize polyamides having a number average molecular weight of at least 5000. The melting points of the useful polyamides range from about 150° C. to about 280° C. It is preferred to utilize polyamides which are linear polymers with a melting point in excess of about 200° C. In addition to the use of copolymers, the blended polymer compositions of the present invention may also contain a mixture of two or more of the above-described polyamides.

III. Polymers of Vinyl Aromatic Compounds

The blended polymer compositions of the present invention contain from about 1 to about 97% by weight of at least one polymer of a vinyl aromatic compound. The polymers may be homopolymers, copolymers, terpolymers of graft polymers. The copolymers include polymers of the vinyl aromatic compound and one or more copolymerizable monomers such as unsaturated dicarboxylic acid reagent including the acids, anhydrides, imides, metal salts and partial esters of said acids; acrylic acids and esters; alkyl-substituted acrylic acids and esters; acrylonitriles; dienes such as butadiene; etc. The terpolymers include polymers of the vinyl aromatic compound with two or more monomers including dienes, acrylonitrile, acrylic acids and esters, etc. Preferably the polymer blends of the invention comprise from about 5 to about 25% by weight of the polymer (III), and more often, from about 5% to about 15% by weight.

The vinyl aromatic compounds include styrene and the various substituted styrenes which is represented by the following formula

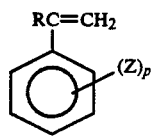

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of homopolymers of vinyl aromatic compounds include polystyrene, poly(alpha-methylstyrene), poly(p-methylstyrene) and high impact polystyrene (HIPS).

The maleic anhydride and maleimide derivative compounds utilized in the formation of the copolymers with vinyl aromatic compounds may generally be represented by the formula

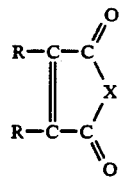

wherein each R group is hydrogen or an aliphatic or aromatic hydrocarbyl group or the two R groups are joined together to form a fused ring derivative, X is —O— or >NR$^2$ where R$_2$ is a hydrocarbyl group which may be an aliphatic or an aromatic hydrocarbyl group such as phenyl, methyl, ethyl, propyl, butyl, etc. Preferably both R groups are hydrogen.

Examples of maleic derivatives which are cyclic or bicyclic compounds include

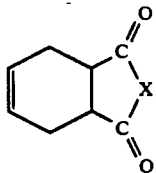

obtained by a Diels-Alder reaction of butadiene with maleic anhydride or a maleimide

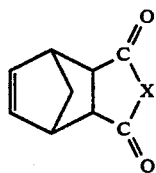

obtained by a Diels-Alder reaction of cyclopentadiene with maleic anhydride or maleimide, and

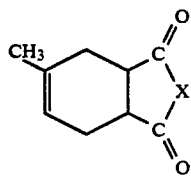

obtained by a Diels-Alder reaction of isoprene with maleic anhydride or an N-substituted maleimide. These cyclic or bicyclic derivatives have high glass transition temperatures.

Copolymers comprising a vinyl aromatic compound and metal salts of maleic acid also are useful in the blended polymer compositions of the present invention. The metals present in the metal salt of maleic acid may be Group I metals, Group II metals or transition metals. Alkali metals and transition metals are preferred. Partial esters of the unsaturated anhydrides also can be used. These can be obtained, for example, by reacting or esterifying, maleic acid or maleic anhydride with less than one equivalent of an alcohol such as methanol, ethanol, propanol, etc.

Examples of copolymerizable acrylic acids and esters include: methyl acrylate, ethyl acrylate, butyl acrylate, methyl methacrylate. Other vinyl monomers which can be used to form the copolymers and terpolymers include vinyl acetate, vinyl methyl ether, vinyl ethyl ether, vinyl chloride, isobutene, etc. The vinyl aromatic compounds also can be polymerized with dienes such as butadiene. SBR is a commercially available copolymer of styrene-butadiene.

The copolymers of the vinyl aromatic compounds with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic compound to a temperature at which the vinyl aromatic compound will polymerize, (2) stirring the polymerizing vinyl aromatic compound while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic compound is polymerizing. Procedures for preparing such copolymers are known in the art and have been described in, for example, U.S. Pat. No. 2,971,939.

In one embodiment, the styrene-maleic anhydride copolymers are preferred third polymers (III) in the blended polymer compositions of the present invention. The styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150, 250, 350 and 700 which are believed to be blends and/or grafts of SMA with SBR.

Other examples of impact modified styrenic and alpha-methyl styrene copolymers with maleic anhydride and acrylonitrile include Arvyl 300 MR and 300 CR.

Low molecular weight styrene-maleic anhydride copolymers (Mw as low as 1500) also are useful and these are available commercially such as from Monsanto under the designation "Scripset" and from Atochem under the designation "SMA Resins". Sulfonated styrene-maleic anhydride copolymers (and their metal salts) also are available and useful in this invention. Two such products are available from Atochem:SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; styrene methacrylic acid; styrene-butadiene; styrene-isoprene; and the hydrogenated versions of styrene-butadiene and styrene isoprene copolymers. The copolymers may be of the grafted or block types.

Other terpolymers useful in this invention include: acrylonitrile-chlorinated polyethylene-styrene (ACS); acrylic-styrene-acrylonitrile (ASA); acrylonitrile-butadiene-styrene (ABS); EPDM; grafted SAN; and styrene-methyl methacrylate-maleic anhydride; etc. Graft polymers include ABS polymers such as Lustran (Monsanto), Cycolac (G.E.), and Magnum (Dow); and HIPS polymers available from many companies such as Amoco, Chevron, Dow, Mobil, Polysar, etc.

In one embodiment, the terpolymers (III) comprise about 45 to 83% (preferably 50 or 60 to 75%) by weight of the vinyl aromatic monomer, from 15 to 35% (preferably 20–30%) by weight of an unsaturated dicarboxylic acid anhydride and from 2 to about 20% (preferably 4–10%) by weight of a $C_{1-3}$ alkyl methacrylate ester. Terpolymers of this type are available commercially from Monsanto.

Blends comprising a polymer of a vinyl aromatic compound and a polyarylene ether are also useful as the third polymer (III) in the blended polymer compositions of the present invention. Among the preferred polyarylene ethers are polyphenylene ethers which may be represented by the following formula

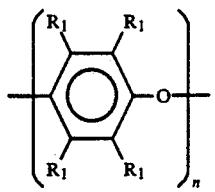

wherein the oxygen ether atom of one unit is connected to the phenyl nucleus of the next adjoining unit; each $R_1$ is independently a monovalent substituent selected from the group consisting of hydrogen, halogen, hydrocarbon groups free of a tertiary alpha-carbon atom, halohydrocarbon groups having at least 2 carbon atoms between the halogen atom and the phenyl nucleus and also being free of a tertiary alpha-carbon atom, hydrocarbonoxy groups free of aliphatic, tertiary alpha-carbon atoms and halohydrocarbonoxy groups containing at least 2 carbon atoms between the halogen atom and the phenyl nucleus and being free of an aliphatic, tertiary alpha-carbon atom; n is an integer of at least about 50 such as from about 50 to about 800 and preferably from about 100 to about 300. Such polyarylene ethers may have molecular weights in the range of between 1000 and 100,000 and more preferably between about 6000 and 100,000. A preferred example of a polyarylene ether is poly(2,6-dimethyl-1,4-phenylene)ether. Examples of polyphenylene ethers useful in the blended polymer compositions of the present invention and methods for their preparation are described in, for example, U.S. Pat. Nos. 3,306,874; 3,306,875; 3,257,357; and 3,257,358, and these patents are incorporated by reference for their disclosures of such polymers.

Typical styrene polymers which can be blended or reacted with the polyphenylene ethers include, for example, homopolymers such as polystyrene and polychlorostyrene, modified polystyrenes such as rubber-modified polystyrenes (high impact styrenes) and the styrene-containing copolymers such as the styrene-acrylonitrile copolymers (SAN), styrene-butadiene copolymers, styrene-acrylonitrile-alpha-alkylstyrene copolymers, styrene-acrylonitrile-butadiene copolymers (ABS), poly-alpha-methylstyrene, copolymers of ethyl vinyl benzene and divinyl benzene, etc.

Blends of styrene resins with these polyarylene ethers such as polyphenylene ethers are available commercially. For example, blends comprising polystyrene and polyphenylene ether typically containing from about 25 to about 50% by weight of polystyrene units are commercially available from the General Electric Company under the tradename NORYL TM thermoplastic resin. The molecular weight of such blends may range from about 10,000 to about 50,000 and more often will be about 30,000.

IV. Mixture of Compatibilizing Agents

The blended polymer compositions of the present invention comprising the alpha-olefin polymer, the polyamide, and the polymer or copolymer of vinyl aromatic compound and carboxylic acid reagent are compatibilized in accordance with the present invention by a combination of polymeric materials which are effective to compatibilize the polymer mixture. The amount of the mixture of compatibilizers incorporated into the polymer blends of the present invention may vary from about 1% to about 25% by weight based on the combined weight of the polymer blend. In another embodiment, the polymer blends of the present invention contain from about 1 to about 10% and more preferably from about 2.5 to about 7.5% by weight of the compatibilizer mixture.

IVa. At Least One Selectively Hydrogenated Block Co-Polymer of a Vinyl Aromatic Compound and a Conjugated Diene One of the compatibilizing agents which may be utilized in the compatibilizing mixture is at least one selectively hydrogenated block copolymer of a vinyl aromatic hydrocarbon and a conjugated diene.

The block copolymers of vinyl aromatic hydrocarbons and conjugated dienes which may be utilized in the polymer blends of the present invention include any of those which exhibit elastomeric properties and those which have 1,2-microstructure contents prior to hydrogenation of from about 7% to about 100%. The block copolymers may be diblock, triblock, multiblock, starblock, polyblock or graftblock copolymers. Throughout this specification and claims, the terms diblock, triblock, multiblock, polyblock, and graft or graftedblock with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in *Block Copolymers, Science Technology*, Dale J. Meier, Ed., Harwood Academic Publishers, 1979, at pages 1-5.

Such block copolymers may contain various ratios of conjugated dienes to vinyl aromatic hydrocarbons including those containing up to about 60% by weight of vinyl aromatic hydrocarbon. Accordingly, multi-block copolymers may be utilized which are linear or radial symmetric or asymmetric and which have structures represented by the formulae A—B, A—B—A, A—B—A—B, B—A—B, $(AB)_{0,1,2}$-. . . BA, etc., wherein A is a polymer block of a vinyl aromatic hydrocarbon or a conjugated diene/vinyl aromatic hydrocarbon tapered copolymer block, and B is a polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion is from about 10 to about 80%, and the vinyl content is preferably from about 25 to about 65%, particularly 35 to 55% when it is desired that the modified block copolymer exhibit rubbery elasticity. The vinyl content of the block copolymer can be measured by means of nuclear magnetic residence.

Specific examples of diblock copolymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, and alpha-methylstyrene-isoprene-alpha-methylstyrene.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5 to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are the hydrogenated block copolymers of styrene-isoprene-styrene such as an (ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP). One example of a commercially available selectively hydrogenated is Kraton G-1652 which is a hydrogenated SBS triblock comprising 30% styrene end blocks and a midblock equivalent is a copolymer of ethylene and 1-butene (EB). This hydrogenated block copolymer is often referred to as SEBS.

In another embodiment, the selectively hydrogenated block copolymer is of the formula $$B_n(AB)_oA_p$$

wherein
n = 0 or 1;
o is 1 to 100;
p is 0 or 1;
each B prior to hydrogenation is predominantly a polymerized conjugated diene hydrocarbon block having a number average molecular weight of about 20,000 to about 450,000;
each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

IVb. Hydrogenated Block Copolymer of a Vinyl Aromatic Hydrocarbon and a Conjugated Diene Grafted with an Alpha Olefinically Unsaturated Carboxylic Acid Reagent One of the compatibilizing agents which may be utilized in the present invention is a product which is obtained by grafting an alpha, beta-olefinically unsaturated monocarboxylic or dicarboxylic acid reagent onto the selectively hydrogenated block copolymers described above as compatibilizer (IVa).

The block copolymers of the conjugated diene and the vinyl aromatic hydrocarbon (IVa) are grafted with an alpha, beta-olefinically unsaturated monocarboxylic or dicarboxylic acid reagent. The carboxylic acid reagents include carboxylic acids per se and their functional derivatives such as anhydrides, imides, metal salts, esters, etc., which are capable of being grafted onto the selectively hydrogenated block copolymer. The grafted polymer will usually contain from about 0.2 to about 20%, and preferably from about 0.1 to about 10% by weight based on the total weight of the block copolymer and the carboxylic acid reagent of the grafted carboxylic acid.

The monobasic alpha,bata-olefinically unsaturated carboxylic acid reagents are carboxylic acids corresponding to the formula $$RCH{=}C(R_1)COOH$$

wherein R is hydrogen or a saturated aliphatic or alicyclic, aryl, alkaryl or heterocyclic group. Preferably, R is hydrogen or an alkyl group containing from 1 to about 10 carbon atoms. $R_1$ is hydrogen or an alkyl group containing from 1 to about 10 carbon atoms. The total number of carbon atoms in R and $R_1$ should not exceed 18 carbon atoms. Specific examples of useful monobasic carboxylic acids include acrylic acid, methacrylic acid, cynamic acid, crotonic acid, acrylic anhydride, sodium acrylate, calcium acrylate and magnesium acrylate, etc. Examples of dicarboxylic acids and useful derivatives thereof include maleic acid, maleic anhydride, fumaric acid, mesaconic acid, itaconic acid, citraconic acid, itaconic anhydride, citraconic anhydride, monomethyl maleate, monosodium maleate, etc.

In order to promote the grafting of the carboxylic acid reagent to the hydrogenated block copolymer, free radical initiators are utilized, and these initiators usually are either peroxides of various organic azo compounds. The amount of initiator utilized generally from about 0.01% to about 5% by weight based on the combined weight of the combined copolymer and the carboxylic reagent. The amount of carboxylic acid reagent grafted onto the block copolymers can be measured by determining the total acid number of the product. The grafting reaction can be carried out by melt or solution mixing of the block copolymer and the carboxylic acid reagent in the presence of the free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X from Shell, often referred to as a maleated selectively hydrogenated SEBS copolymer.

IVc. Terpolymer of Alpha-Olefin, Acrylic Ester, and either an Olefinically Unsaturated Dicarboxylic Acid Reagent or a Glycidyl Acrylate One of the compatibilizers which may be utilized in the polymer blends of the present invention may be a terpolymer of an olefin, acrylic ester and either a dicarboxylic acid or a glycidyl acrylate. In one embodiment, the terpolymer will comprise from about 60% to about 94% by weight of the olefin, from about 5% to about 40% by weight of the acrylic ester, and from about 1% to about 10% of the dicarboxylic acid or glycidyl acrylate.

The olefins used in the preparation of the terpolymers (IVc) are alpha-olefins, and any of the alpha-olefins described as being useful in preparing the alpha-olefin polymers (I) described above can be utilized in the formation of the terpolymers (IVc). In one preferred embodiment, the alpha-olefins contain from 2 to about 6 carbon atoms, and more preferably, the alpha-olefin is ethylene, propylene or a mixture of ethylene and propylene.

The acrylic esters used in the formation of the terpolymer (IVc) are characterized by the formula

wherein R is hydrogen, or an alkyl group containing 1 to 4 carbon atoms such as a methyl or ethyl group, and R' is an alkyl group containing from 1 to about 6 carbon atoms. Specific examples of esters characterized by the above formula which are useful in forming the terpolymers (IVc) include methyl acrylate, ethyl acrylate, butyl acrylate, methyl methacrylate, ethyl methacrylate, ethyl ethacrylate, etc.

The third component utilized in the preparation of the terpolymers (IVc) may be at least one alpha,beta-olefinically unsaturated dicarboxylic acid reagent. The dicarboxylic acid reagents include the dicarboxylic acids, anhydrides, partial esters, imides, metal salts, etc., and any of the carboxylic acid reagents described as being useful in the preparation of the block copolymers (IVb). In one embodiment, the preferred dicarboxylic acid reagent is maleic anhydride.

The third monomer used in the preparation of terpolymer (IVc) may be a glycidyl acrylate such as represented by the formula

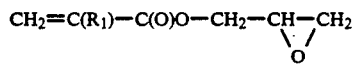

wherein $R_1$ is hydrogen or a lower alkyl group of 1 to 6 carbon atoms. Preferably $R_1$ is hydrogen or a methyl or ethyl group.

Specific examples of monomer mixtures which can be utilized to form terpolymers useful as compatibilizers in the present invention include ethylene-methyl acrylate-maleic anhydride; ethylene-ethyl acrylate-maleic anhydride; ethylene-butyl acrylate-maleic anhydride; propylene-methyl acrylate-maleic anhydride; propylene-ethyl acrylate-maleic anhydride; ethylene-methyl acrylate-glycidyl methacrylate; ethylene-methyl acrylate-glycidyl acrylate; etc.

The terpolymers which are useful as one of the compatibilizers in the polymer blends of the present invention can be prepared by known techniques, and some are available commercially. For example, CdF Chimie offers a number of such terpolymers under the general trade designation Lotader ™. Specific examples include Lotader ™ 3200 (formerly LX4110) prepared from a mixture comprising about 88% by weight of ethylene, 9% by weight of butyl acrylate and 3% of maleic anhydride. This terpolymer has a melt index of 5 and an acid index is determined by titration of 19 mg KOH/g, a melting point of 107° C. Lotader ™ 6600 comprises about 70% of ethylene, 27% of an acrylic ester and about 3% maleic anhydride. This terpolymer has an acid index of 17 mg KOH/g. Lotader ™ 4700 which comprises about 62.5% ethylene, 32% of an acrylic ester and about 1.5% of maleic anhydride has a melt index of about 40, a melting point of 70° C. and an acid index of 17 mg KOH/g. Lotader ™ AH8660 is a terpolymer of ethylene, an acrylic ester, and glycidyl methacrylate with a melting point of 79° C. and a vicat softening point (ASTM D1525, 1KG) of 34° C. Additional examples of terpolymers include terpolymers comprising: 77% ethylene/20% ethyl acrylate/3% maleic anhydride; 89.5% ethylene, 7% ethyl acrylate and 3.5% maleic anhydride; and 70% ethylene/28.5% ethyl acrylate/ and 1.5% maleic anhydride.

The mixtures of compatibilizers (IV) useful in this invention may comprises mixtures of: (IVc) and (IVb); (IVa) and (IVc); (IVb) and (IVc); or (IVa), (IVb) and (IVc), although the first two mixtures are preferred. The relative amounts of the compatibilizers in the mixture may vary over a wide range from 1% to about 25%. In the preferred two component mixtures, the weight ratio of (IVa) to (IVb) and (IVa) to (IVc) ranges from about 3:1 to about 1:3. One particularly useful ratio is 1:1.

V. Fillers and Fibers

The blended polymer compositions of the present invention may, and generally do contain one or more fillers of the types used in the polymer art. Examples of fillers employed in a typical compounded polymer blend according to the present invention included talc, calcium carbonate, mica, wollasnite, dolomite, glass fibers, boron fibers, carbon fibers, carbon blacks (conductive or non-conductive), pigments such as titanium dioxide, or mixtures thereof. Preferred fillers include commercially available talc such as R. T. Vanderbilt's Select-O-Sorb and glass fibers. The amount of filler and fibers included in the blended polymer compositions of the present invention may vary from about 1% to about 70% of the combined weight of polymer in filler. Generally, amounts of from 5% to 30% are utilized.

The fillers and fibers may be treated with coupling agents to improve the bond between the fillers and fibers to the resin. For example, the fillers can be treated with materials such as fatty acids (e.g., stearic acid), silanes, maleated polypropylene, etc. The amount of coupling agents used is an amount effective to improve the bond between the fillers and fibers with the resin. Other additives may be included in the polymer blends of the present invention to modify or to obtain desirable properties. For example, stabilizers and inhibitors of oxidative, thermal and ultraviolet light degradation may be included in the polymer blends as well as lubricants and mold release agents, colorants including dyes and pigments, nucleating agents, plasticizers, etc., may be included in the polymer blends.

The stabilizers can be incorporated into the composition at any stage in the preparation of the polymer blends, and preferably, the stabilizers are included early to preclude the initiation of degradation before the composition can be protected. The oxidative and thermal stabilizers useful in the polymer blends of the present invention include those used in addition polymers generally. They include, for example, up to about 1% by weight, based on the weight of the polymer blend, of Group I metal halides such as sodium, potassium, lithium and cuprous halides (e.g., chloride, bromide, and iodide), hindered phenols, hydroquinones, and various substituted derivatives of these materials and combinations thereof.

The ultraviolet light stabilizers may be included in amounts of up to about 2% by weight based on the weight of the polymer blend. Examples of ultraviolet light stabilizers include various substituted resorcinols, salicylates, benzotriazoles, benzophenones, etc.

Suitable lubricants and mold release agents may be included in amounts of up to about 1% by weight based on the weight of the polymer blend include materials such as stearic acid, stearic alcohol, stearamides, organic dies such as nigrosine, pigments such as titanium dioxide, cadmium sulfide, carbon black, etc. The plasticizers which may be included in amounts of up to about 20% by weight based on the weight of the polymer blend include materials such as dioctylphthalate, bibenzylphthalate, butylbenzophthalate, hydrocarbon oils, sulfonamides such as paratoluene ethyl sulfonamides, etc.

The blended polymer compositions of the present invention including the olefin polymer (I), the polyamide (II), the copolymer (III), the two or more compatibilizers (IV), and additives can be prepared by techniques well known to those skilled in the art. For example, a particularly useful procedure is to intimately mix the polymers using conventional mixing equipment such as a mill, a Banbury mixer, a Brabender Torque Rheometer, a single or twin screw extruder, continuous mixers, kneaders, etc. For example, the polymers may be intimately mixed in the form of granules and/or powder in a high shear mixer. One preferred process for preparing the blended polymers utilizes the Farrel Continuous Mixer (FCM CP-23). Short residence times and high shear are readily obtained in a CP-23. "Intimate" mixing means that the mixture is prepared with sufficient mechanical shear and thermal energy to produce a dispersed phase which is finely divided and homogeneously dispersed in the continuous or principal phase.

The blended polymer compositions of the present invention may be prepared by melt-blending at least about 1% to about 97% by weight of the olefin polymer (I), from about 1% to about 97% by weight of a polyamide resin (II), from about 1% to about 97% of the copolymer III and an effective amount (generally from about 1% to about 10% by weight) of the mixture of two or more compatibilizers (IV). The polymer blends of the present invention are characterized as having improved impact strengths.

The blended polymer compositions of the present invention can be processed into shaped articles by extrusion, coextrusion, thermo-forming, blow-molding, injection-molding, compression-molding, calendering, laminating, stamping, pultrusion, etc. In particular, shaped articles can be prepared by thermoforming sheets of the blended polymer compositions of the present invention.

The blended polymer compositions of the present invention are recyclable. For example, scrap material produced from processing of the blended polymer compositions of the present invention such as scrap material from thermoforming processes can be recovered, reground and blended with uncured polymers of the same or different composition, and this blend can thereafter be used in the same manner as virgin material. For example, blended polymer comprising a blend of polypropylene-styrene maleic anhydride, nylon, and scrap containing ethylene-vinyl alcohol can be used to form sheets having desirable characteristics. Also, scrap containing ethylene vinyl alcohol can be coextruded with the blended polymer compositions of the invention. The amount of scrap materials included in the blended polymer compositions of the invention may vary from the 1 ato about 99% by weight, and more preferably from about 10 to about 60% by weight of scrap based on the total weight of the blended polymer of the invention and the scrap.

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all parts and percentages are by weight, temperatures are in degrees Centigrade, and pressures are at or near atmospheric. The physical properties described in the following examples are measured in accordance with ASTM Standard Test Procedures as identified in the following Table I.

TABLE I

| Property | ASTM Method |
|---|---|
| Tensile Strength | D-638 |
| Elongation | D-638 |
| Flexural Strength | D-790 |
| Flexural Modulus (tangent) | D-790 |
| Izod Impact (notched) | D-256* |
| Izod Impact (unnotched) | D-256 |
| Gardner Impact | D-3029 |
| Heat Deflection Temp. | D-648 |
| Melt Flow Rate | D-1238** |

*Method A.
**Condition 230° C./2.16 Kg.

EXAMPLE 1

A blend of polypropylene (Himont Profax 6523), nylon 6 (Capron 8200 HS), Arco Dylark 350 (SMA), and a mixture of an SEBS polymer (Kraton G1652) and a maleated SEBS polymer (Kraton FG1901X) is prepared. A 34 mm. Leistriertz counter-rotating intermeshing twin screw extruder (L/D ratio=28:1) is used to prepare the blend at a melt temperature of 480° F. Control A is a blend similar to Example 1 but containing neither compatibilizer. Control B is a blend similar to Example 1 except that only Kraton G1652 is included as a compatibilizer. Control C is a blend similar to Example 1 except only Kraton FG1901X is included as a compatibilizer.

The above blends are ground, and injection molded into test specimens. The make-up of the blends and some of their properties are summarized in Table II.

TABLE II

| | Controls | | | Ex. 1 |
|---|---|---|---|---|
| | A | B | C | |
| Composition (% w) | | | | |
| Profax 6523 (PP) | 80 | 76 | 76 | 76 |
| Capron 8200 (Nylon 6) | 10 | 9.5 | 9.5 | 9.5 |
| Dylark 350 (SMA) | 10 | 9.5 | 9.5 | 9.5 |
| Kraton G1652 (SEBS) | — | 5.0 | 0 | 2.5 |
| Kraton FG1901X (MA-SEBS) | — | — | 5.0 | 2.5 |
| Properties | | | | |
| Flexural Strength, psi | 7982 | 6907 | 6967 | 7160 |
| Flexural Modulus, psi | 263,000 | 230,000 | 232,000 | 239,000 |
| Gardner Impact, (RT) in. lb. | 5.6 | 19.4 | 16.0 | 50.4 |
| HDT at 66 psi, °C. | 103.5 | 100.0 | 94.0 | 96.3 |
| Linear Shrinkage in./in. % | 1.21 | 1.15 | 1.17 | 1.13 |

EXAMPLE 2

A blended polymer composition is prepared similar to the blend of Example 1 with the exception that a terpolymer (Lotader-3200) is used in lieu of Kraton FG1901X. The controls are similar to the blends of Example 2 except that Control D contains no compatibilizer, and Controls E and F contain only one compatibilizer. The make-up of the blends and some of their physical properties are summarized in the following Table III.

TABLE III

| | Control | | | Ex. 2 |
|---|---|---|---|---|
| | D | E | F | |
| Composition (% w) | | | | |
| Profax 6523 (PP) | 80 | 76 | 76 | 76 |
| Capron 8200 (Nylon 6) | 10 | 9.5 | 9.5 | 9.5 |
| Dylark 350 (SMA) | 10 | 9.5 | 9.5 | 9.5 |
| Kraton G1652 (SEBS) | — | 5.0 | 0 | 2.5 |
| Lotader LX3200 (terpolymer) | — | — | 5.0 | 2.5 |
| Properties | | | | |
| Flexural Strength, psi | 7982 | 6907 | 7393 | 7214 |
| Flexural Modulus, psi | 263,000 | 230,000 | 242,000 | 239,000 |
| Gardner Impact, (RT) in. lb. | 5.6 | 19.4 | 15.0 | 37.1 |
| HDT at 66 psi, °C. | 103.5 | 100.0 | 96.5 | 97.0 |
| Linear Shrinkage in./in. % | 1.21 | 1.15 | 1.12 | 1.18 |

The blended polymer compositions of the present invention are useful for automotive, electrical, electronics, building, furniture, small appliances, and other applications.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A blended polymer composition comprising
   (I) from about 60% to about 90% by weight of at least one alpha-olefin polymer selected from the group consisting of polypropylene and copolymers of ethylene and propylene;
   (II) from about 5% to about 25% by weight of at least one polyamide;
   (III) from about 5% to about 25% by weight of at least one copolymer of a vinyl aromatic hydrocarbon and an unsaturated mono-or dicarboxylic acid reagent, wherein the copolymer is other than a graft copolymer; and
   (IV) from about 1% up to about 25% by weight of a mixture of two or more compatibilizing agents selected from the group consisting of
   (IVa) at least one selectively hydrogenated block copolymer of a vinyl aromatic hydrocarbon and a conjugated diene;
   (IVb) at least one selectively hydrogenated block copolymer of a vinyl aromatic hydrocarbon and a conjugated diene to which has been grafted, an alpha, beta-olefinically unsaturated monocarboxylic or dicarboxylic acid reagent; and
   (IVc) at least one terpolymer of an alpha-olefin, at least one acrylic ester, and an alpha, beta-olefinically unsaturated dicarboxylic acid reagent, or a glycidyl acrylate, wherein (IV) comprises mixtures of (IVa) and (IVb), (IVa) and (IVc), (IVb) and (IVc), or (IVa), (IVb), and (IVc).

2. The polymer composition of claim 1 wherein said composition further comprises a scrap material comprising the same composition obtained from a preceding molding operation using the polymer composition of claim 1.

3. The polymer composition of claim 1 wherein the polyamide (II) is selected from the group consisting of polyhexamethylene adipamide, polyhexamethylene sebacamide, polycaprolactam, polyhexamethylene isophthalamide, polyhexamethylene tere-co-isophthalamide, polytetramethylene adipamide and mixtures thereof.

4. The polymer composition of claim 1 wherein the copolymer (III) is a copolymer of a styrene and a maleic anhydride or an N-hydrocarbyl-substituted maleimide.

5. The polymer composition of claim 1 comprising from about 1% to about 25% by weight of the compatibilizing agents (IV).

6. The polymer composition of claim 1 wherein the compatibilizing agent mixture is a mixture of (IVa) and (IVc).

7. The polymer composition of claim 1 wherein the block copolymers of (IVa) and (IVb) prior to hydrogenation, are each independently styrene-butadiene-styrene block copolymers.

8. The polymer composition of claim 1 wherein the carboxylic acid reagent in (IVb) is a dicarboxylic acid, anhydride, imide, half ester, metal salt, or mixtures thereof.

9. The polymer composition of claim 8 wherein the dicarboxylic acid compound is maleic acid.

10. The polymer composition of claim 1 wherein the terpolymer (IVc) comprises from about 60% to about 94% by weight of the olefin, from about 5% to about 40% by weight of the acrylic ester and from about 1% to about 10% by weight of the dicarboxylic acid reagent or the glycidyl acrylate.

11. The polymer composition of claim 1 also containing
(V) at least one filler, fiber or mixture thereof.

12. The polymer composition of claim 11 wherein the filler is talc or calcium carbonate, and the fiber is a glass fiber.

13. A blended polymer composition comprising
(I) from about 70% to about 90% by weight of at least one alpha-olefin polymer selected from the group consisting of polyethylene, and polypropylene,
(II) from about 5% to about 25% by weight of at least one polyamide having a number average molecular weight of at least about 5000;
(III) from about 5% to about 25% by weight of a copolymer of styrene and maleic anhydride; and
(IV) from about 1% to about 25% by weight of a mixture of two or more compatibilizing agents selected from the group consisting of
(IVa) at least one selectively hydrogenated block copolymer of a vinyl aromatic hydrocarbon and an aliphatic conjugated diene;
(IVb) at least one selectively hydrogenated block copolymer of a vinyl aromatic hydrocarbon and an aliphatic conjugated diene to which has been grafted an alpha, beta-olefinically unsaturated monocarboxylic or dicarboxylic acid reagent; and
(IVc) at least one terpolymer of ethylene or propylene, an acrylic ester and maleic acid, maleic anhydride, or a glycidyl acrylate.

14. The polymer composition of claim 13 also containing
(V) at least one filler to mixtures thereof.

15. The polymer composition of claim 14 wherein the filler is talc or calcium carbonate, and the fiber is a glass fiber.

16. The polymer composition of claim 13 wherein the polyamide (II) is selected from the group consisting of polyhexamethylene adipamide, polyhexamethylene sebacamide, polyhexamethylene tere-co-isophthalamide, polytetramethylene adipamide and mixtures thereof.

17. The polymer composition of claim 13 wherein the mixture of (IV) is a mixture of (IVa) and (IVb).

18. The polymer composition of claim 13 wherein the mixture of (IV) is a mixture of (IVa) and (IVc).

19. The polymer composition of claim 13 wherein the block copolymer of (IVa) and (IVb) prior to hydrogenation, are each independently styrene-butadien-e-styrene block copolymers.

20. The polymer composition of claim 13 wherein the carboxylic acid reagent in (IVb) is a dicarboxylic acid, anhydride, imide, half ester or metal salt, or mixtures thereof.

21. The polymer composition of claim 13 wherein the terpolymer (IVc) comprises from about 60% to about 94% by weight of ethylene, propylene or a mixture thereof, from about 5% to about 40% by weight of the acrylic ester and from about 1% to about 5% by weight of maleic acid or maleic anhydride.

* * * * *